United States Patent
Wang et al.

(10) Patent No.: US 11,424,879 B2
(45) Date of Patent: Aug. 23, 2022

(54) COMMUNICATION METHOD AND SYSTEM, STORAGE MEDIUM AND PROCESSOR

(71) Applicant: ZTE Corporation, Shenzhen (CN)

(72) Inventors: Yuxin Wang, Shenzhen (CN); Chuangxin Jiang, Shenzhen (CN); Zhaohua Lu, Shenzhen (CN); YuNgok Li, Shenzhen (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 200 days.

(21) Appl. No.: 16/760,053

(22) PCT Filed: Aug. 30, 2018

(86) PCT No.: PCT/CN2018/103355
§ 371 (c)(1),
(2) Date: Aug. 17, 2020

(87) PCT Pub. No.: WO2019/095785
PCT Pub. Date: May 23, 2019

(65) Prior Publication Data
US 2020/0382251 A1    Dec. 3, 2020

(30) Foreign Application Priority Data
Nov. 17, 2017    (CN) .......................... 201711148876.0

(51) Int. Cl.
*H04W 72/04*    (2009.01)
*H04L 5/00*    (2006.01)
*H04W 72/12*    (2009.01)

(52) U.S. Cl.
CPC ......... *H04L 5/0048* (2013.01); *H04W 72/042* (2013.01); *H04W 72/0446* (2013.01); *H04W 72/1284* (2013.01)

(58) Field of Classification Search
CPC ......... H04W 72/0406; H04W 72/0413; H04W 72/0446; H04W 72/042; H04W 72/1284; H04W 72/044; H04L 5/0048; H04J 3/00
See application file for complete search history.

(56) References Cited

U.S. PATENT DOCUMENTS

| | | | |
|---|---|---|---|
| 9,572,063 B2 * | 2/2017 | Etemad | H04W 40/246 |
| 2012/0063371 A1 * | 3/2012 | He | H04L 5/0048 370/280 |

(Continued)

FOREIGN PATENT DOCUMENTS

| | | |
|---|---|---|
| CN | 103686861 A | 3/2012 |
| CN | 102761968 A | 10/2012 |

(Continued)

OTHER PUBLICATIONS

International Search Report for corresponding application PCT/CN2018/103355 filed Aug. 30, 2018; dated Nov. 5, 2018.

(Continued)

*Primary Examiner* — Wei Zhao
(74) *Attorney, Agent, or Firm* — Cantor Colburn LLP

(57) ABSTRACT

Provided in the embodiments of the present disclosure are a communication method and system. The method at least includes: determining a base sequence that a second communication node uses to send a reference signal; and receiving the reference signal that is sent by the second communication node using the base sequence.

18 Claims, 2 Drawing Sheets

---

Determine a base sequence that a second communication node uses for sending a reference signal — S102

Receive the reference signal that is sent by the second communication node using the base sequence — S104

(56) References Cited

U.S. PATENT DOCUMENTS

2015/0071194 A1* 3/2015 Kim .................... H04W 72/042
370/329
2016/0345352 A1 11/2016 Langereis

FOREIGN PATENT DOCUMENTS

| CN | 103973392 A | 8/2014 |
| CN | 106817210 A | 6/2017 |
| CN | 108123785 A | 6/2018 |

OTHER PUBLICATIONS

Discussion on SRS design for NR, 3GPP TSG RAN WG1 Meeting 90bis, Prague, CZ, Oct. 9-13, 2017, Source: ZTE, Sanechips.

* cited by examiner

COMMUNICATION METHOD AND SYSTEM, STORAGE MEDIUM AND PROCESSOR

CROSS-REFERENCE TO RELATED APPLICATION

The present application is based upon and claims priority to Chinese Patent Application No. 201711148876.0, filed on Nov. 17, 2017, the entire contents of which are incorporated herein by reference.

TECHNICAL FIELD

The present disclosure relates to the field of communications, and in particular to a communication method and system, a storage medium and a processor.

BACKGROUND

In relevant technologies, a Physical Downlink Control Channel (PDCCH) is used for bearing uplink and downlink scheduling information as well as uplink power control information in Long Term Evolution (LTE). Downlink Control Information (DCI) formats include DCI format 0, 1, 1A, 1B, 1C, 1D, 2, 2A, 3, 3A and the like. In LTE-A Release 12 (LTE-A version 12), new DCI formats such as DCI format 2B, 2C and 2D are further provided to support multiple different application and transmission modes. A first communication node (e.g., e-Node-B which is abbreviated as eNB) may configure a second communication node (e.g., User Equipment which is abbreviated as UE) via the DCI. Alternatively, the second communication node may also accept configurations of higher layers, namely, the UE may be configured via higher-layer signaling.

A Sounding Reference Signal (SRS) is a signal that is used to measure Channel State Information (CSI) between second communication node and a first communication node. In the LTE, the UE sends, at designated timing according to a frequency band, a frequency domain position, a sequence cyclic shift, a periodicity, a subframe offset and other parameters indicated by the eNB, an uplink SRS on a last data symbol of a sending subframe. The eNB determines uplink CSI of the UE according to the received SRS, and performs operations such as frequency domain selected scheduling and closed-loop power control according to the obtained CSI.

It is put forward in a research of LTE-A Release 10 (LTE-A version 10) that a non-precoded SRS (that is, an antenna dedicated SRS) should be used in uplink communication, while a De-Modulation Reference Signal (DMRS) of a Physical Uplink Shared Channel (PUSCH) should be precoded. The first communication node can estimate original uplink CSI by virtue of the reception of the non-precoded SRS. However, the first communication node cannot estimate the original uplink CSI according to the precoded DMRS. In such a situation, when the UE uses multiple antennas to send the non-precoded SRS, an SRS resource required by each UE is increased, which results in the decrease of the number of UEs capable of being multiplexed at the same time in a system. UE may send an SRS by means of two trigger types, which are respectively trigger type 0 (i.e., the UE sends the SRS via higher-layer signaling) or trigger type 1 (i.e., the UE sends the SRS via the DCI. The SRS triggered based on the higher-layer signaling is a periodic SRS, while the SRS triggered based on the DCI is a non-periodic SRS. With the increase of the non-periodic SRS sending manner in the LTE-A Release 10, the utilization rate of the SRS is improved to some extent, and the resource scheduling flexibility is improved.

In an LTE/LTE-A system, when an SRS sequence has a length smaller than 72, 30 SRS root sequences are available. When the SRS sequence has a length greater than or equal to 72, if a group hopping function is disabled, 60 SRS root sequences are available, otherwise, 30 SRS root sequences are available.

Along with the development of communication technologies, a demand on data services is ever-increasing whereas available low-frequency carriers have already become very scarce. Hence, communication based on high-frequency (30-300 GHz) carriers that have not yet been fully utilized is one of important communication solutions to future high-speed data communication. The communication based on high-frequency carriers has a very large available bandwidth and is capable of providing effective high-speed data communication. Nevertheless, one big technical challenge confronted by the communication based on high-frequency carriers is that a high-frequency signal has a very large spatial fading compared with a low-frequency signal. Such a characteristic of the high-frequency signals causes a spatial fading loss problem of the high-frequency signals in outdoor communication, but owing to the decreased wavelength of the high-frequency signals, more antennas may often be used and the communication may be performed based on beams to compensate the spatial fading loss.

However, with the increase of the number of antennas, as each antenna needs to be provided with a set of radio-frequency chain and digital beam based forming needs to be supported, the increase of cost and power loss is inevitably caused. Therefore, the current research trends to hybrid beam forming, that is, a radio-frequency beam and a digital beam forms a final beam jointly.

In a high-frequency communication system adopting a New Radio Access Technology (NR), a first communication node is provided with a great number of antennas to form a downlink transmission beam to compensate spatial fading in high-frequency communication, and second communication node is also provided with a great number of antennas to form an uplink transmission beam. In such a situation, an SRS is also sent in the form of a beam. With the increase of the number of users in the NR system, the requirement on a capacity of the SRS is increased. As a consequence, there is a need to further increase the number of root sequences of the SRS, especially in a condition where a sequence group hopping of the SRS is enabled. In addition, a frame structure in the NR system has obvious changes as compared with a frame structure of an LTE/LTE-A system. Moreover, in addition to inter-time slot frequency hopping, intra-time slot frequency hopping is also supported in the NR system. However, there is no corresponding communication solution in relevant technologies.

Concerning the above-mentioned problems in relevant technologies, an effective solution has not been found till now.

SUMMARY

The embodiments of the present disclosure provide a communication method and system, a storage medium and a processor, to at least provide a manner for sending an uplink reference signal in an NR system.

According to an embodiment of the present disclosure, a communication method is provided, which is applied to a first communication node and includes that: a base sequence that a second communication node uses to send a reference signal is determined; and the reference signal that is sent by the second communication node using the base sequence is received.

According to an embodiment of the present disclosure, another communication method is provided, which is applied to a first communication node and includes that: a radio resource that a second communication node uses to send a reference signal is determined; and the reference signal that is sent by the second communication node using the radio resource is received.

According to an embodiment of the present disclosure, another communication method is provided, which is applied to a second communication node and includes that: a base sequence for sending a reference signal is determined; and the reference signal is sent to a first communication node using the base sequence.

According to another embodiment of the present disclosure, a communication method is provided, which is applied to a second communication node and includes that: a radio resource used to send a reference signal is determined; and the reference signal is sent to a first communication node using the radio resource.

According to another embodiment of the present disclosure, a communication system is provided, which includes a first communication node and a second communication node.

The second communication node is configured to determine a radio resource used to send a reference signal; and send the reference signal using the radio resource.

The first communication node is configured to determine the radio resource used by the second communication node to send the reference signal; and receive the reference signal that is sent by the second communication node using the radio resource.

According to a still another embodiment of the present disclosure, a storage medium is further provided; the storage medium includes a stored program; and the program executes, when running, the above-mentioned communication method applied to a first communication node and/or a second communication node.

According to a still another embodiment of the present disclosure, a processor is further provided; the processor is configured to run a program; and the program executes, when running, the above-mentioned communication method applied to a first communication node and/or a second communication node.

In the embodiments of the present disclosure, by determining a base sequence used by a second communication node to send an uplink reference signal, a manner for sending the uplink reference signal in an NR system is provided.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below in detail with reference to the accompanying drawings and in combination with the embodiments. It is to be noted that the embodiments of the present disclosure and the characteristics of the embodiments may be combined with each other if there is no conflict.

It should be noted that, terms such as "first" and "second" in the specification, claims and accompanying drawings of the present disclosure are only used to distinguish similar objects, rather than to describe a special order or a precedence order.

First Embodiment

A network architecture in which the solution of this embodiment of the present disclosure can be implemented includes: a first communication node and a second communication node. The first communication node can interact with the second communication node.

The first communication node is a node configured to determine a sending manner of the second communication node and indicate information to the second communication node via signaling. The second communication node is a node configured to receive the signaling. In an implementation mode, the first communication node may be a node such as a base station of a macro cell, a base station or a transmission node of a small cell, a sending node in a high-frequency communication system, and a sending node in an internet-of-things system. The second communication node may be a node in communication systems such as a UE, a mobile phone, a portable device and a vehicle. In another implementation mode, the base station of the macro cell, the base station or the transmission node of the small cell, the sending node in the high-frequency communication system, the node in the internet-of-things system, and the like may serve as the second communication node, and the UE and the like may serve as the first communication node.

Figure 1:
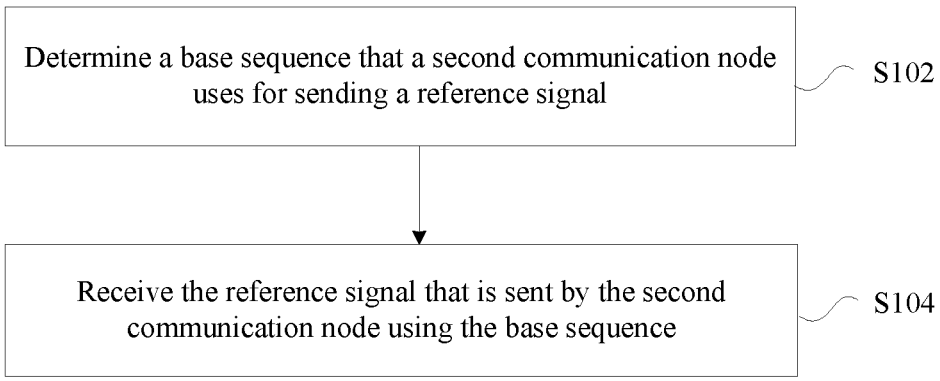
FIG. 1 is a flowchart of a communication method according to an embodiment of the present disclosure.

In this embodiment, a communication method implemented in the network architecture is provided. FIG. 1 is a flowchart of a communication method according to an embodiment of the present disclosure, which is applied to a first communication node. As shown in FIG. 1, the flowchart includes the following operations.

At S102, a base sequence that a second communication node uses to send a reference signal is determined.

At S104, the reference signal that is sent by the second communication node using the base sequence is received.

By means of the above operations, the reference signal is an uplink reference signal; and by determining a base sequence used by a second communication node for sending the uplink reference signal, a manner for sending the uplink reference signal in an NR system is provided.

The uplink reference signal may be an SRS, or an uplink DMRS, or an uplink signal for random access.

In at least one exemplary embodiment, a generation manner of the uplink reference signal may include that: when a group hopping of the uplink reference signal is enabled, a first communication node determines, according to a pseudo-random number corresponding to an index of a time slot where the uplink reference signal sent by the second communication node is located, a base sequence number of the uplink reference signal. The group hopping being enabled refers to that a group hopping function is being started, or the group hopping function is used.

In at least one exemplary embodiment, the generation manner of the uplink reference signal may include that: the first communication node determines the base sequence number of the uplink reference signal according to a sequence group number, a sequence length and/or a sequence identity on the time slot where the uplink reference signal sent by the second communication node is located.

For example, the base sequence number of the uplink reference signal may be determined according to the following formula: $v=c(n_s)$, where the v is the base sequence number of the uplink reference signal, the $n_s$ is a time slot number, and the $c(n_s)$ represents pseudo-random numbers on different time slots.

In at least one exemplary embodiment, when the first communication node determines the base sequence number of the uplink reference signal according to a sequence group number on the time slot where the uplink reference signal sent by the second communication node is located, the base sequence number of the reference signal may be determined according to one of the following formulas.

$$v = u(n_s) \bmod 2;$$

$$v = \begin{cases} 1 & \text{if } 0 \le u \le 14 \\ 0 & \text{otherwise} \end{cases}; \text{ and}$$

$$v = \begin{cases} 1 & \text{if } 0 \le u \le 14 \\ 0 & \text{otherwise} \end{cases}.$$

In these formulas, the v is the base sequence number of the uplink reference signal, the $n_s$ is a time slot number, and the $u(n_s)$ represents sequence group numbers on different time slots.

In at least one exemplary embodiment, when the first communication node determines the base sequence number of the uplink reference signal according to a sequence group number and a sequence identity on the time slot where the uplink reference signal sent by the second communication node is located, the base sequence number of the uplink reference signal may be determined according to one of the following formulas.

When the sequence identity is greater than or equal to 0 and smaller than 252, v=0, and when the sequence identity is greater than or equal to 0 and smaller than 252, v=1.

When the sequence identity is greater than or equal to 0 and smaller than 252, v=1, and when the sequence identity is greater than or equal to 0 and smaller than 252, v=0.

When the sequence identity is greater than or equal to 0 and smaller than 504, $v=u(n_s) \bmod 2$.

$$v = \begin{cases} 1 & \text{if } 0 \le u \le 14 \text{ and } 0 \le \text{sequence identity} < 252 \\ 0 & \text{otherwise} \end{cases};$$

$$v = \begin{cases} 1 & \text{if } 0 \le u \le 14 \text{ and } 0 \le \text{sequence identity} < 252 \\ 0 & \text{otherwise} \end{cases};$$

$$v = \begin{cases} 1 & \text{if } 0 \le u \le 14 \text{ and } 252 \le \text{sequence identity} < 504 \\ 0 & \text{otherwise} \end{cases}; \text{ and}$$

$$v = \begin{cases} 1 & \text{if } 0 \le u \le 14 \text{ and } 252 \le \text{sequence identity} < 504 \\ 0 & \text{otherwise} \end{cases}.$$

In these formulas, the v is the base sequence number of the uplink reference signal, the $n_s$ is a time slot number, and the $u(n_s)$ represents sequence group numbers on different time slots.

Figure 2:
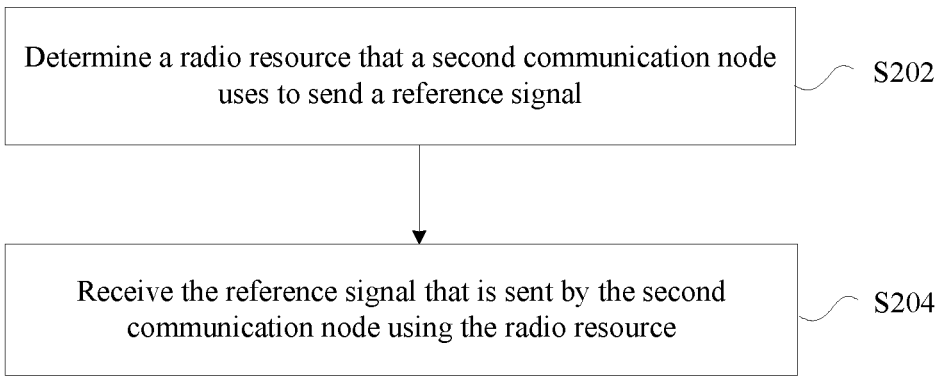
FIG. 2 is a flowchart of another communication method according to an embodiment of the present disclosure.

In this embodiment, a communication method implemented in the network architecture is provided. FIG. 2 is a flowchart of another communication method according to an embodiment of the present disclosure. As shown in FIG. 2, the flowchart includes the following operations.

At S202, a radio resource that a second communication node uses to send a reference signal is determined.

At S204, the reference signal that is sent by the second communication node using the radio resource is received.

The radio resource includes a time domain resource. The time domain resource meets at least one of the following relationships.

$$(10 \cdot n_f N_{slot}^{subframe,\mu} + n_{s,f}^\mu - T_{offset}) \bmod T_{SRS} = 0 \text{ ; and}$$

$$(n_f N_{slot}^{frame,\mu} + n_{s,f}^\mu - T_{offset}) \bmod T_{SRS} = 0.$$

In these formulas, the $n_{s,f}^\mu \in \{0, \ldots, N_{slot}^{frame,\mu}-1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{offset}$ is a time slot offset of an SRS, and the $T_{SRS}$ is an SRS periodicity. The uplink reference signal is an uplink SRS.

In at least one exemplary embodiment, the radio resource includes a frequency domain resource. When the reference signal is an SRS, the frequency domain resource may include that: a frequency domain position of the SRS is determined according to a sending quantity or number of an uplink SRS on a time domain.

In at least one exemplary embodiment, the sending quantity or number of the uplink SRS on the time domain may be obtained based on at least one of the following parameters:

an intra-frame time slot index, a system frame number, an SRS periodicity, a time slot offset of an SRS, a number of time slots contained in one subframe, a number of time slots contained in one system frame, a number of time domain symbols for sending the SRS in a time slot, a number of repeated time domain symbols in a time slot or a number of SRS time domain symbols occupying a same frequency domain position in a time slot.

In at least one exemplary embodiment, the sending quantity or number of the uplink SRS on the time domain is obtained according to one of the following formulas.

$$n_{SRS} = \left\lfloor \left(n_f \cdot 10 \cdot N_{slot}^{subframe,\mu} + n_{s,f}^u\right) \cdot \frac{N}{R} \cdot \frac{1}{T_{SRS}} \right\rfloor;$$

$$n_{SRS} = \left\lfloor \left(n_f \cdot N_{slot}^{subframe,\mu} + n_{s,f}^u\right) \cdot \frac{N}{R} \cdot \frac{1}{T_{SRS}} \right\rfloor;$$

$$n_{SRS} = \left\lfloor \left(n_f \cdot 10 \cdot N_{slot}^{subframe,\mu} + n_{s,f}^u\right) \cdot \frac{1}{T_{SRS}} \right\rfloor; \text{ and}$$

$$n_{SRS} = \left\lfloor \left(n_f \cdot N_{slot}^{subframe,\mu} + n_{s,f}^u\right) \cdot \frac{1}{T_{SRS}} \right\rfloor.$$

In these formulas, the $n_{s,f}^\mu \in \{0, \ldots, N_{slot}^{frame,\mu}-1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{SRS}$ is an SRS periodicity, the N is a number of time domain symbols configured for sending the SRS in the time slot, the R is a number of repeated time domain symbols in a time slot or a number of SRS time domain symbols occupying a same frequency domain position in a time slot, and the $n_{SRS}$ is the sending quantity or number of the uplink SRS on the time domain.

Figure 3:
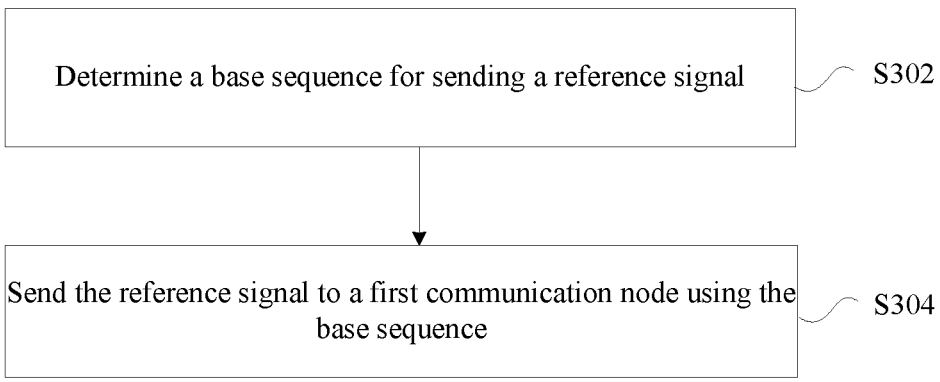
FIG. 3 is a flowchart of a still another communication method according to an embodiment of the present disclosure.

This embodiment provides a communication method implemented in the network architecture. FIG. 3 is a flowchart of another communication method according to an embodiment of the present disclosure. As shown in FIG. 3, the flowchart includes the following operations.

At S302, a base sequence of a reference signal is determined.

At S304, the reference signal is sent to a first communication node using the base sequence.

In at least one exemplary embodiment, the operation that a base sequence that a second communication node uses to send a reference signal is determined includes at least one of.

A base sequence number of the reference signal is determined according to a pseudo-random number corresponding to an index of a time slot where the reference signal sent by the second communication node is located.

A base sequence number of the reference signal is determined according to a sequence group number on a time slot where the reference signal sent by the second communication node is located.

A base sequence number of the reference signal is determined according to a sequence length on a time slot where the reference signal sent by the second communication node is located.

A base sequence number of the reference signal is determined according to a sequence identity on a time slot where the reference signal sent by the second communication node is located.

This embodiment further provides another communication method, which is applied to a second communication node and includes that: a radio resource used to send a reference signal is determined; and the reference signal is sent to a first communication node using the radio resource.

In at least one exemplary embodiment, the radio resource includes at least one of: a time domain resource, a frequency domain resource and a code domain resource.

In at least one exemplary embodiment, the code domain resource includes a base sequence of the reference signal. Radio resource indication information is information for indicating a base sequence number for sending the reference signal.

In at least one exemplary embodiment, the radio resource includes the time domain resource. The time domain resource meets at least one of the following relationships.

$(10 \cdot n_f N_{slot}^{subframe,\mu} + n_{s,f}^\mu - T_{offset}) \bmod T_{SRS} = 0$; and $(n_f N_{slot}^{frame,\mu} + n_{s,f}^\mu - T_{offset}) \bmod T_{SRS} = 0$.

In these formulas, the $n_{s,f}^\mu \in \{0, \ldots, N_{slot}^{frame,\mu} - 1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{offset}$ is a time slot offset of an SRS, and the $T_{SRS}$ is an SRS periodicity. The uplink reference signal is an uplink SRS.

In at least one exemplary embodiment, the radio resource includes the frequency domain resource. When the reference signal is an SRS, the frequency domain resource may include that: a frequency domain position of the SRS is determined according to a sending quantity or number of an uplink SRS on a time domain.

In at least one exemplary embodiment, the sending quantity or number of the uplink SRS on the time domain is obtained based on at least one of the following parameters: an intra-frame time slot index, a system frame number, an SRS periodicity, a time slot offset of an SRS, a number of time slots contained in one subframe, a number of time slots contained in one system frame, a number of time domain symbols for sending the SRS in a time slot, a number of repeated time domain symbols in a time slot or a number of SRS time domain symbols occupying a same frequency domain position in a time slot.

In at least one exemplary embodiment, the sending quantity or number of the uplink SRS on the time domain is obtained according to one of the following formulas.

$$n_{SRS} = \left\lfloor \left( n_f \cdot 10 \cdot N_{slot}^{subframe,\mu} + n_{s,f}^u \right) \cdot \frac{N}{R} \cdot \frac{1}{T_{SRS}} \right\rfloor;$$

$$n_{SRS} = \left\lfloor \left( n_f \cdot N_{slot}^{subframe,\mu} + n_{s,f}^u \right) \cdot \frac{N}{R} \cdot \frac{1}{T_{SRS}} \right\rfloor;$$

$$n_{SRS} = \left\lfloor \left( n_f \cdot 10 \cdot N_{slot}^{subframe,\mu} + n_{s,f}^u \right) \cdot \frac{1}{T_{SRS}} \right\rfloor; \text{ and}$$

$$n_{SRS} = \left\lfloor \left( n_f \cdot N_{slot}^{subframe,\mu} + n_{s,f}^u \right) \cdot \frac{1}{T_{SRS}} \right\rfloor.$$

In these formulas, the $n_{s,f}^\mu \in \{0, \ldots, N_{slot}^{frame,\mu} - 1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{SRS}$ is an SRS periodicity, the N is a number of time domain symbols configured for sending the SRS in the time slot, the R is a number of repeated time domain symbols in a time slot or a number of SRS time domain symbols occupying a same frequency domain position in a time slot, and the $n_{SRS}$ is the sending quantity or number of the uplink SRS on the time domain.

Based on the above-mentioned descriptions on the implementation mode, the person skilled in the art may clearly understand that the method of the embodiments of the present disclosure may be implemented by software plus a necessary universal hardware platform, and may alternatively be implemented by hardware, but under most conditions, the former is a better implementation mode. Based on such an understanding, the essential content of the technical solutions of the embodiments of the present disclosure, or the part making contributions in view of the conventional art may be implemented in a form of a software product. The computer software product is stored in a storage medium (such as a Read Only Memory (ROM)/Random Access Memory (RAM), a magnetic disk, and an optical disc) and includes a plurality of instructions for instructing a terminal device (which may be a mobile phone, a computer, a server, or a network device, etc.) to execute the methods described in the embodiments of the present disclosure.

Second Embodiment

In the method of this embodiment, a first communication node indicates, to a second communication node via signaling, radio resources that are used to send an uplink reference signal, and the second communication node receives the signaling sent by the first communication node and sends the reference signal on the radio resource indicated by the signaling.

The radio resource includes: a time domain resource, a frequency domain resource and/or a code domain resource. The code domain resource may be a base sequence.

In at least one exemplary embodiment, an operation that a base sequence that a second communication node uses to send a reference signal is determined includes at least one of the following operations.

A base sequence number of the reference signal is determined according to a pseudo-random number corresponding to an index of a time slot where the reference signal sent by the second communication node is located.

A base sequence number of the reference signal is determined according to a sequence group number on a time slot where the reference signal sent by the second communication node is located.

A base sequence number of the reference signal is determined according to a sequence length on a time slot where the reference signal sent by the second communication node is located.

A base sequence number of the reference signal is determined according to a sequence identity on a time slot where the reference signal sent by the second communication node is located.

In at least one exemplary embodiment, the operation that a base sequence number of the reference signal is determined according to a sequence group number on a time slot where the reference signal sent by the second communication node is located may include that the base sequence number is determined according to a following formula:

$v = c(n_s)$, where the $v$ is the base sequence number of the uplink reference signal, the $n_s$ is a time slot number, and the $c(n_s)$ represents pseudo-random numbers on different time slots.

In at least one exemplary embodiment, the operation that a base sequence number of the reference signal is determined according to a sequence group number on a time slot where the reference signal sent by the second communication node is located includes one of the followings.

$$v = u(n_s) \bmod 2;$$

$$v = \begin{cases} 0 & \text{if } 0 \leq u \leq 14 \\ 0 & \text{otherwise} \end{cases}; \text{ and}$$

$$v = \begin{cases} 0 & \text{if } 0 \leq u \leq 14 \\ 0 & \text{otherwise} \end{cases}.$$

In these formulas, the $v$ is the base sequence number of the uplink reference signal, the $n_s$ is a time slot number, and the $u(n_s)$ represents sequence group numbers on different time slots.

In at least one exemplary embodiment, the operation that a base sequence number of the reference signal is determined according to a sequence group number and a sequence identity on a time slot where the reference signal sent by the second communication node is located includes one of the followings.

When the sequence identity is greater than or equal to 0 and smaller than 252, v=0, and when the sequence identity is greater than or equal to 0 and smaller than 252, v=1.

When the sequence identity is greater than or equal to 0 and smaller than 252, v=1, and when the sequence identity is greater than or equal to 0 and smaller than 252, v=0 .

When the sequence identity is greater than or equal to 0 and smaller than 504, v=u(n_s)mod 2.

$$v = \begin{cases} 1 & \text{if } 0 \leq u \leq 14 \text{ and } 0 \leq \text{sequence identity} < 252 \\ 0 & \text{otherwise} \end{cases};$$

$$v = \begin{cases} 1 & \text{if } 0 \leq u \leq 14 \text{ and } 0 \leq \text{sequence identity} < 252 \\ 0 & \text{otherwise} \end{cases};$$

$$v = \begin{cases} 1 & \text{if } 0 \leq u \leq 14 \text{ and } 252 \leq \text{sequence identity} < 504 \\ 0 & \text{otherwise} \end{cases}; \text{ and}$$

$$v = \begin{cases} 1 & \text{if } 0 \leq u \leq 14 \text{ and } 252 \leq \text{sequence identity} < 504 \\ 0 & \text{otherwise} \end{cases}.$$

In these formulas, the $v$ is the base sequence number of the uplink reference signal, the $n_s$ is a time slot number, and the $u(n_s)$ represents sequence group numbers on different time slots.

In at least one exemplary embodiment, the reference signal includes at least one of: an uplink SRS, an uplink DMRS, and an uplink signal for random access.

In at least one exemplary embodiment, the radio resource includes the time domain resource. The time domain resource meets at least one of the following relationships.

$$(10 \cdot n_f \cdot N_{slot}^{subframe,\mu} + n_{s,f}^\mu - T_{offset}) \bmod T_{SRS} = 0; \text{ and}$$

$$(n_f \cdot N_{slot}^{frame,\mu} + n_{s,f}^\mu - T_{offset}) \bmod T_{SRS} = 0.$$

In these formulas, the $n_{s,f}^\mu \in \{0, \ldots, N_{slot}^{frame,\mu} - 1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{offset}$ is a time slot offset of an SRS, and the $T_{SRS}$ is an SRS periodicity. The uplink reference signal is an uplink SRS.

In at least one exemplary embodiment, the radio resource includes the frequency domain resource. When the reference signal is an SRS, the frequency domain resource may include that: a frequency domain position of the SRS is determined according to a sending quantity or number of an uplink SRS on a time domain.

In at least one exemplary embodiment, the sending quantity or number of the uplink SRS on the time domain is obtained based on at least one of the following parameters: an intra-frame time slot index, a system frame number, an SRS periodicity, a time slot offset of an SRS, a number of time slots contained in one subframe, a number of time slots contained in one system frame, a number of time domain symbols for sending the SRS in a time slot, a number of repeated time domain symbols in a time slot or a number of SRS time domain symbols occupying a same frequency domain position in a time slot.

The sending quantity or number of the uplink SRS on the time domain is obtained according to one of the following formulas.

$$n_{SRS} = \left\lfloor \left(n_f \cdot 10 \cdot N_{slot}^{subframe,\mu} + n_{s,f}^u\right) \cdot \frac{N}{R} \cdot \frac{1}{T_{SRS}} \right\rfloor;$$

$$n_{SRS} = \left\lfloor \left(n_f \cdot N_{slot}^{subframe,\mu} + n_{s,f}^u\right) \cdot \frac{N}{R} \cdot \frac{1}{T_{SRS}} \right\rfloor;$$

$$n_{SRS} = \left\lfloor \left(n_f \cdot 10 \cdot N_{slot}^{subframe,\mu} + n_{s,f}^u\right) \cdot \frac{1}{T_{SRS}} \right\rfloor; \text{ and}$$

$$n_{SRS} = \left\lfloor \left(n_f \cdot N_{slot}^{subframe,\mu} + n_{s,f}^u\right) \cdot \frac{1}{T_{SRS}} \right\rfloor.$$

In these formulas, the $n_{s,f}^\mu \in \{0, \ldots, N_{slot}^{frame,\mu} - 1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{SRS}$ is an SRS periodicity, the N is a number of time domain symbols configured for sending the SRS in the time slot, the R is a number of repeated time domain symbols in a time slot or a number of SRS time domain symbols occupying a same frequency domain position in a time slot, and the $n_{SRS}$ is the sending quantity or number of the uplink SRS on the time domain.

Third Embodiment

This embodiment provides a communication system for implementing the above-mentioned embodiments and exemplary implementation modes. The content that has been described will no longer be repeated. As used below, the term "module" may implement a combination of software and/or hardware having a predetermined function. Although the device described in the following embodiments is implemented by software preferably, the implementation of hardware or a combination of the software and the hardware may also be conceivable.

Figure 4:
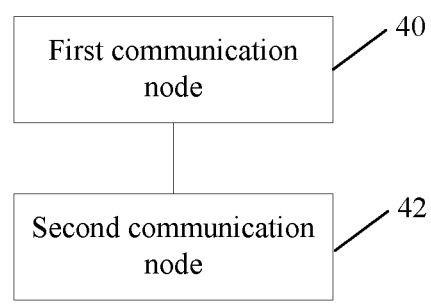
FIG. 4 is a structural block diagram of a communication system according to an embodiment of the present disclosure.

FIG. 4 is a structural block diagram of a communication system according to an embodiment of the present disclosure. As shown in FIG. 4, the communication system includes: a first communication node 40 and a second communication node 42.

The second communication node 42 is configured to determine a radio resource used to send a reference signal, and send the reference signal using the radio resource.

The first communication node 40 is configured to determine the radio resource used by the second communication node to send the reference signal, and receive the reference signal that is sent by the second communication node using the radio resource.

And/or,

The second communication node 42 is configured to determine a base sequence for sending a reference signal, and send the reference signal to the first communication node using the base sequence.

The first communication node 40 is configured to determine the base sequence that the second communication node uses for sending the reference signal, and receive the reference signal that is sent by the second communication node using the base sequence.

For a situation where the radio resource is determined, the following descriptions are provided.

The first communication node 40 includes: a first determination module and a receiving module.

The first determination module is configured to determine a radio resource that a second communication node uses to send a reference signal.

The receiving module is configured to receive the reference signal that is sent by the second communication node using the radio resource.

The second communication node includes: a second determination module and a sending module.

The second determination module is configured to determine the radio resource used to send the reference signal.

The sending module is configured to send the reference signal using the radio resource.

It is to be noted that each module may be implemented by software or hardware. The later may be implemented in the following manner but is not limited thereto: the above modules are located in the same processor; or the above modules are respectively located in different processors in any combined form.

Fourth Embodiment

In a high-frequency communication system adopting an NR, a first communication node is provided with a great number of antennas to form a downlink transmission beam to compensate spatial fading in high-frequency communication, and a second communication node of a user is also provided with a great number of antennas to form an uplink transmission beam. In such a situation, an SRS is also sent in the form of a beam. With the increase of the number of users in the NR system, the requirement on a capacity of the SRS is increased. As a consequence, there is a need to further increase the number of root sequences of the SRS, especially in a condition where a sequence group hopping of the SRS is enabled. In addition, a frame structure in the NR system has obvious changes as compared with a frame structure of an LTE/LTE-A system. Moreover, in addition to inter-time slot frequency hopping, intra-time slot frequency hopping is also supported in the NR system. This embodiment redesigns an SRS frequency hopping calculation manner of the SRS, and determines what condition of the time slot is used to send the SRS. Hereinafter, this embodiment is described below from three aspects of a time domain, a frequency domain and a code domain.

Implementation Mode 1

A first communication node indicates, via signaling, a resource used by a second communication node to send an uplink reference signal, or, the first communication node and the second communication node both predefine the resource used by the second communication node to send the uplink signal.

The resource includes at least one of: a time domain resource, a frequency domain resource, and a generation manner of an uplink reference signal sequence (code domain resource).

The generation manner of the uplink reference signal sequence includes at least one of the followings.

(1) When a group hopping of the uplink reference signal sequence is enabled, a first communication node determines, according to a pseudo-random number corresponding to an index of a time slot where an uplink reference signal sent by a second communication node is located, a base sequence number of the uplink reference signal.

(2) A first communication node determines, according to a sequence group number, a sequence length and/or a sequence identity on a time slot where an uplink reference signal sent by a second communication node is located, a base sequence number of the uplink reference signal.

The operation that a first communication node determines, according to a pseudo-random number corresponding to an index of a time slot where an uplink reference signal sent by a second communication node is located, a base sequence number of the uplink reference signal includes at least one of the followings.

$v=c(n_s)$, where the c(i) is a pseudo-random sequence.

The operation that a first communication node determines, according to a sequence group number on a time slot where an uplink reference signal sent by a second communication node is located, a base sequence number of the uplink reference signal includes at least one of the followings.

$v = u(n_s) \bmod 2;$ (1)

$v = \begin{cases} 0 & \text{if } 0 \le u \le 14 \\ 0 & \text{otherwise} \end{cases}$ ; and (2)

$v = \begin{cases} 0 & \text{if } 0 \le u \le 14 \\ 0 & \text{otherwise} \end{cases}$. (3)

The operation that a first communication node determines, according to a sequence group number and a sequence identity on a time slot where an uplink reference signal sent by a second communication node is located, a base sequence number of the uplink reference signal includes at least one of the followings.

When the sequence identity is greater than or equal to 0 and smaller than 252, v=0, and when the sequence identity is greater than or equal to 0 and smaller than 252, v=1.

When the sequence identity is greater than or equal to 0 and smaller than 252, v=1, and when the sequence identity is greater than or equal to 0 and smaller than 252, v=0.

When the sequence identity is greater than or equal to 0 and smaller than 504, v=u($n_s$)mod 2.

$v = \begin{cases} 1 & \text{if } 0 \le u \le 14 \text{ and } 0 \le \text{sequence identity} < 252 \\ 0 & \text{otherwise} \end{cases}$ $v = \begin{cases} 1 & \text{if } 0 \le u \le 14 \text{ and } 0 \le \text{sequence identity} < 252 \\ 0 & \text{otherwise} \end{cases}$ $v = \begin{cases} 1 & \text{if } 0 \le u \le 14 \text{ and } 252 \le \text{sequence identity} < 504 \\ 0 & \text{otherwise} \end{cases}$ $v = \begin{cases} 1 & \text{if } 0 \le u \le 14 \text{ and } 252 \le \text{sequence identity} < 504 \\ 0 & \text{otherwise} \end{cases}$

Implementation Mode 2

A first communication node indicates, via signaling, a resource used by a second communication node to send an uplink reference signal, or, the first communication node and the second communication node both predefine the resource used by the second communication node to send the uplink signal.

The resource includes at least one of: a time domain resource, a frequency domain resource, and a generation manner of an uplink reference signal sequence.

The time domain resource includes at least one of the followings: the uplink reference signal is sent on a time slot meeting the following relationships.

$(10 \cdot n_f N_{slot}^{subframe,\mu} + n_{s,f}^{\mu} - T_{offset}) \bmod T_{SRS} = 0$ Or, $(n_f N_{slot}^{frame,\mu} + n_{s,f}^{\mu} - T_{offset}) \bmod T_{SRS} = 0$.

In these formulas, the $n_{s,f}^{\mu} \in \{0, \ldots, N_{slot}^{frame,\mu}-1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{offset}$ is a time slot offset of an SRS, and the $T_{SRS}$ is an SRS periodicity.

A configuration table for the periodicity and the time slot offset of the SRS is as shown in table 1.

TABLE 1

| SRS Configuration Index ISRS | SRS Periodicity $T_{SRS}$ (slots) | SRS Subframe Offset $T_{offset}$ |
| --- | --- | --- |
| 0-1 | 2 | ISRS |
| 2-6 | 5 | ISRS − 2 |
| 7-16 | 10 | ISRS − 7 |
| 17-36 | 20 | ISRS − 17 |
| 37-76 | 40 | ISRS − 37 |
| 77-156 | 80 | ISRS − 77 |
| 157-316 | 160 | ISRS − 157 |
| 317-636 | 320 | ISRS − 317 |
| 637-1023 | reserved | reserved |

Implementation Mode 3

A first communication node indicates, via signaling, a resource used by a second communication node to send an uplink reference signal, or, the first communication node and the second communication node both predefine the resource used by the second communication node to send the uplink signal.

The resource includes at least one of: a time domain resource, a frequency domain resource, and a generation manner of an uplink reference signal sequence.

The frequency domain resource includes at least one of: a frequency domain position of an SRS is determined according to a sending quantity or number of the SRS on a time domain. The sending quantity or number of the uplink SRS on the time domain is obtained based on at least one of the following parameters: an intra-frame time slot index, a system frame number, an SRS periodicity, a time slot offset of an SRS, a number of time slots contained in one subframe, a number of time slots contained in one system frame, a number of time domain symbols for sending the SRS in a time slot, a number of repeated time domain symbols in a time slot or a number of SRS time domain symbols occupying a same frequency domain position in a time slot.

The frequency domain position of the SRS is determined according to the sending quantity or number of the SRS on the time domain, and the sending quantity or number of the uplink SRS on the time domain is obtained based on at least one of the following manners.

$n_{SRS} = \left\lfloor \left(n_f \cdot 10 \cdot N_{slot}^{subframe,\mu} + n_{s,f}^{u}\right) \cdot \frac{N}{R} \cdot \frac{1}{T_{SRS}} \right\rfloor;$ (1)

$n_{SRS} = \left\lfloor \left(n_f \cdot N_{slot}^{subframe,\mu} + n_{s,f}^{u}\right) \cdot \frac{N}{R} \cdot \frac{1}{T_{SRS}} \right\rfloor;$ (2)

$n_{SRS} = \left\lfloor \left(n_f \cdot 10 \cdot N_{slot}^{subframe,\mu} + n_{s,f}^{u}\right) \cdot \frac{1}{T_{SRS}} \right\rfloor;$ and (3)

$n_{SRS} = \left\lfloor \left(n_f \cdot N_{slot}^{subframe,\mu} + n_{s,f}^{u}\right) \cdot \frac{1}{T_{SRS}} \right\rfloor.$ (4)

In these formulas, the $n_{s,f}^{\mu} \in \{0, \ldots, N_{slot}^{frame,\mu}-1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{SRS}$ is an SRS periodicity, the N is a number of time domain symbols configured for sending the SRS in the time slot, and the R is a number of repeated time domain symbols in a time slot or a number of SRS time domain symbols occupying a same frequency domain position in a time slot.

Implementation Mode 4

A first communication node indicates, via signaling, a resource used by a second communication node to send an uplink reference signal, or, the first communication node and the second communication node both predefine the resource used by the second communication node to send the uplink signal.

The resource includes at least one of: a generation manner of an uplink reference signal sequence (code domain resource).

The generation manner of the uplink reference signal sequence includes at least one of the followings.

(1) A first communication node determines, according to a sequence group number, a sequence length and/or a sequence identity on a time slot where an uplink reference signal sent by a second communication node is located, a base sequence number of the uplink reference signal.

For example, when the sequence length is smaller than 72, the base sequence number of the uplink reference signal is fixed as 0; when the sequence length is greater than or equal to 72 and smaller than 144, the base sequence number of the uplink reference signal is 0 or 1; and when the sequence length is greater than or equal to 144, the base sequence number of the uplink reference signal is 0 or 1 or 2 or −1.

Fifth Embodiment

This embodiment of the present disclosure provides a storage medium. The storage medium includes a stored program. The program executes, when running, the above-mentioned communication method applied to a first communication node and/or a second communication node.

In at least one exemplary embodiment, the storage medium may be configured to store a program code for executing the following operations.

At S1, a base sequence that a second communication node uses to send a reference signal is determined.

At S2, the reference signal that is sent by the second communication node using the base sequence is received.

Alternatively or Additionally, the storage medium may be configured to store a program code for executing the following operations:

At S3, a radio resource that a second communication node uses to send a reference signal is determined.

At S4, the reference signal that is sent by the second communication node using the radio resource is received.

In at least one exemplary embodiment, the storage medium may be configured to store a program code for further executing the following operations:

A base sequence for sending a reference signal is determined; and the reference signal is sent to a first communication node using the base sequence.

Alternatively or Additionally, the storage medium may be configured to store a program code for executing the following operations: a radio resource used to send a reference signal is determined; and the reference signal is sent to a first communication node using the radio resource.

In at least one exemplary embodiment, the storage medium may include but not limited to: various media capable of storing a program code such as a U disk, an ROM, an RAM, a mobile hard disk, a magnetic disk or an optical disc.

This embodiment of the present disclosure further provides a processor. The processor is configured to run a program. The program executes, when running, the above-mentioned communication method applied to a first communication node and/or a second communication node.

In at least one exemplary embodiment, the program is used to execute the following operations.

At S1, a base sequence that a second communication node uses to send a reference signal is determined.

At S2, the reference signal that is sent by the second communication node using the base sequence is received.

Alternatively or Additionally, the program is used to execute a program code of the following operations:

At S3, a radio resource that a second communication node uses to send a reference signal is determined.

At S4, the reference signal that is sent by the second communication node using the radio resource is received.

In at least one exemplary embodiment, the program is used to execute a program code of the following operations.

A base sequence for sending a reference signal is determined; and the reference signal is sent to a first communication node using the base sequence.

Alternatively or Additionally, the storage medium is configured to store a program code for executing the following operations: a radio resource used to send a reference signal is determined; and the reference signal is sent to a first communication node using the radio resource.

Optionally, the specific example in this embodiment may be referred to the examples described in the above embodiments and optional implementation modes, and will no longer be repeated herein.

Obviously, those skilled in the art should understand that the modules or operations of the embodiments of the present disclosure may be implemented by a general-purpose computing device and centralized in a single computing device or distributed over a network consisting of a plurality of computing devices. In at least one exemplary embodiment, they may be implemented by a program code executable by a computing device, so that they may be stored in a storage device and executed by the computing device. Moreover, they may be different from the operations illustrated or described herein in some cases, or implemented by respectively fabricating them into respective integrated circuit modules or by fabricating a plurality of modules or operations of them into a single integrated circuit module. By doing so, the present disclosure is not limited to any specific combination of hardware and software.

The above descriptions are only exemplary embodiments of the present disclosure and are not intended to limit the present disclosure. For the person skilled in the art, the present disclosure may have various modifications and changes. Any modification, equivalent replacement, improvement and the like made within a principle of the disclosure should be included in a protection scope of the disclosure.

What is claimed is:

1. A communication method, applied to a first communication node and comprising:
   determining a radio resource that a second communication node uses to send a reference signal, wherein the radio resource comprises at least one of: a time domain resource, a frequency domain resource and a code domain resource; and
   receiving the reference signal that is sent by the second communication node using the radio resource;
   wherein when the radio resource comprises the code domain resource and the code domain resource comprises a base sequence that the second communication node uses to send the reference signal, the determining a radio resource that a second communication node uses to send a reference signal comprises at least one of:

determining a base sequence number of the reference signal according to a pseudo-random number corresponding to an index of a time slot where the reference signal sent by the second communication node is located;

determining a base sequence number of the reference signal according to a sequence group number on a time slot where the reference signal sent by the second communication node is located;

determining a base sequence number of the reference signal according to a sequence length on a time slot where the reference signal sent by the second communication node is located; and determining a base sequence number of the reference signal according to a sequence identity on a time slot where the reference signal sent by the second communication node is located.

2. The method as claimed in claim 1, wherein the determining a base sequence number of the reference signal according to a sequence group number on a time slot where the reference signal sent by the second communication node is located comprises: determining the base sequence number according to a following formula:

$v=c(n_s)$, where the v is the base sequence number of an uplink reference signal, the $n_s$ is a time slot number, and the $c(n_s)$ represents pseudo-random numbers on different time slots.

3. The method as claimed in claim 1, wherein the determining a base sequence number of the reference signal according to a sequence group number on a time slot where the reference signal sent by the second communication node is located comprises one of the followings:

$v = u(n_s) \bmod 2;$ $v = \begin{cases} 0 & \text{if } 0 \le u \le 14 \\ 0 & \text{otherwise} \end{cases}$ ; and $v = \begin{cases} 0 & \text{if } 0 \le u \le 14 \\ 0 & \text{otherwise} \end{cases},$ where the v is the base sequence number of an uplink reference signal, the $n_s$ is a time slot number, and the $u(n_s)$ represents sequence group numbers on different time slots.

4. The method as claimed in claim 1, wherein the determining a base sequence number of the reference signal according to a sequence group number and a sequence identity on a time slot where the reference signal sent by the second communication node is located comprises one of the followings:

when the sequence identity is greater than or equal to 0 and smaller than 252, v=0, and when the sequence identity is greater than or equal to 0 and smaller than 252, v=1;

when the sequence identity is greater than or equal to 0 and smaller than 252, v=1, and when the sequence identity is greater than or equal to 0 and smaller than 252, v=0; and when the sequence identity is greater than or equal to 0 and smaller than 504, v=u($n_s$)mod 2;

$v = \begin{cases} 1 & \text{if } 0 \le u \le 14 \text{ and } 0 \le \text{sequence identity} < 252 \\ 0 & \text{otherwise} \end{cases};$ $v = \begin{cases} 1 & \text{if } 0 \le u \le 14 \text{ and } 0 \le \text{sequence identity} < 252 \\ 0 & \text{otherwise} \end{cases};$ $v = \begin{cases} 1 & \text{if } 0 \le u \le 14 \text{ and } 252 \le \text{sequence identity} < 504 \\ 0 & \text{otherwise} \end{cases}$ ; and $v = \begin{cases} 1 & \text{if } 0 \le u \le 14 \text{ and } 252 \le \text{sequence identity} < 504 \\ 0 & \text{otherwise} \end{cases},$ where the v is the base sequence number of an uplink reference signal, the $n_s$ is a time slot number, and the $u(n_s)$ represents sequence group numbers on different time slots.

5. The method as claimed in claim 1, wherein the reference signal comprises one of: an uplink Sounding Reference Signal (SRS), an uplink De-Modulation Reference Signal (DMRS), and an uplink signal for random access.

6. The method as claimed in claim 1, wherein when the radio resource comprises the time domain resource, the time domain resource meets at least one of the following relationships:

$(10 \cdot n_f \cdot N_{slot}^{subframe,\mu} + n_{s,f}^{\mu} - T_{offset}) \bmod T_{SRS} = 0;$ and $(n_f \cdot N_{slot}^{frame,\mu} + n_{s,f}^{\mu} - T_{offset}) \bmod T_{SRS} = 0,$ where the $n_{s,f}^{\mu} \in \{0, \ldots, N_{slot}^{frame,\mu} - 1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{offset}$ is a time slot offset of an SRS, and the $T_{SRS}$ is an SRS periodicity; wherein an uplink reference signal is an uplink Sounding Reference Signal (SRS).

7. The method as claimed in claim 1, wherein when the radio resource comprises the frequency domain resource and the reference signal is an SRS, the frequency domain resource comprises: a frequency domain position of the SRS determined according to a sending quantity or number of an uplink SRS on a time domain.

8. The method as claimed in claim 7, wherein the sending quantity or number of the uplink SRS on the time domain is obtained based on at least one of the following parameters:

an intra-frame time slot index, a system frame number, an SRS periodicity, a time slot offset of an SRS, a number of time slots contained in one subframe, a number of time slots contained in one system frame, a number of time domain symbols for sending the SRS in a time slot, a number of repeated time domain symbols in a time slot or a number of SRS time domain symbols occupying a same frequency domain position in a time slot.

9. The method as claimed in claim 8, wherein the sending quantity or number of the uplink SRS on the time domain is obtained according to one of the following formulas:

$n_{SRS} = \left\lfloor \left( n_f \cdot 10 \cdot N_{slot}^{subframe,\mu} + n_{s,f}^{u} \right) \cdot \frac{N}{R} \cdot \frac{1}{T_{SRS}} \right\rfloor;$ $n_{SRS} = \left\lfloor \left( n_f \cdot N_{slot}^{subframe,\mu} + n_{s,f}^{u} \right) \cdot \frac{N}{R} \cdot \frac{1}{T_{SRS}} \right\rfloor;$ -continued $$n_{SRS} = \left\lfloor \left(n_f \cdot 10 \cdot N_{slot}^{subframe,\mu} + n_{s,f}^u\right) \cdot \frac{1}{T_{SRS}} \right\rfloor; \text{ and}$$

$$n_{SRS} = \left\lfloor \left(n_f \cdot N_{slot}^{subframe,\mu} + n_{s,f}^u\right) \cdot \frac{1}{T_{SRS}} \right\rfloor,$$

where the $n_{s,f}^\mu \in \{0, \ldots, N_{slot}^{frame,\mu}-1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{SRS}$ is an SRS periodicity, the N is a number of time domain symbols configured for sending the SRS in the time slot, the R is a number of repeated time domain symbols in a time slot or a number of SRS time domain symbols occupying a same frequency domain position in a time slot, and the $n_{SRS}$ is the sending quantity or number of the uplink SRS on the time domain.

10. A communication method, applied to a second communication node and comprising:
   determining a radio resource for sending a reference signal, wherein the radio resource comprises at least one of: a time domain resource, a frequency domain resource and a code domain resource; and
   sending the reference signal to a first communication node using the radio resource;
   wherein when the radio resource comprises the code domain resource and the code domain resource comprises a base sequence that the second communication node uses to send the reference signal, the determining a radio resource of the second communication node for sending a reference signal comprises at least one of:
   determining a base sequence number of the reference signal according to a pseudo-random number corresponding to an index of a time slot where the reference signal sent by the second communication node is located;
   determining a base sequence number of the reference signal according to a sequence group number on a time slot where the reference signal sent by the second communication node is located;
   determining a base sequence number of the reference signal according to a sequence length on a time slot where the reference signal sent by the second communication node is located; and
   determining a base sequence number of the reference signal according to a sequence identity on a time slot where the reference signal sent by the second communication node is located.

11. The method as claimed in claim 10, wherein when the radio resource comprises the code domain resource and the code domain resource comprises a base sequence that the second communication node uses to send the reference signal, radio resource indication information is information for indicating a base sequence number for sending the reference signal.

12. The method as claimed in claim 10, wherein when the radio resource comprises the time domain resource, the time domain resource meets at least one of the following relationships:

$$(10 \cdot n_f N_{slot}^{subframe,\mu} + n_{s,f}^\mu - T_{offset}) \bmod T_{SRS} = 0; \text{ and}$$

$$(n_f N_{slot}^{frame,\mu} + n_{s,f}^\mu - T_{offset}) \bmod T_{SRS} = 0,$$

where the $n_{s,f}^\mu \in \{0, \ldots, N_{slot}^{frame,\mu}-1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{offset}$ is a time slot offset of an SRS, and the $T_{SRS}$ is an SRS periodicity; wherein an uplink reference signal is an uplink Sounding Reference Signal (SRS).

13. The method as claimed in claim 10, wherein when the radio resource comprises the frequency domain resource and the reference signal is an SRS, the frequency domain resource comprises: a frequency domain position of the SRS determined according to a sending quantity or number of an uplink SRS on a time domain.

14. The method as claimed in claim 13, wherein the sending quantity or number of the uplink SRS on the time domain is obtained based on at least one of the following parameters:
   an intra-frame time slot index, a system frame number, an SRS periodicity, a time slot offset of an SRS, a number of time slots contained in one subframe, a number of time slots contained in one system frame, a number of time domain symbols for sending the SRS in a time slot, a number of repeated time domain symbols in a time slot or a number of SRS time domain symbols occupying a same frequency domain position in a time slot.

15. The method as claimed in claim 14, wherein the sending quantity or number of the uplink SRS on the time domain is obtained according to one of the following formulas:

$$n_{SRS} = \left\lfloor \left(n_f \cdot 10 \cdot N_{slot}^{subframe,\mu} + n_{s,f}^u\right) \cdot \frac{N}{R} \cdot \frac{1}{T_{SRS}} \right\rfloor;$$

$$n_{SRS} = \left\lfloor \left(n_f \cdot N_{slot}^{subframe,\mu} + n_{s,f}^u\right) \cdot \frac{N}{R} \cdot \frac{1}{T_{SRS}} \right\rfloor;$$

$$n_{SRS} = \left\lfloor \left(n_f \cdot 10 \cdot N_{slot}^{subframe,\mu} + n_{s,f}^u\right) \cdot \frac{1}{T_{SRS}} \right\rfloor; \text{ and}$$

$$n_{SRS} = \left\lfloor \left(n_f \cdot N_{slot}^{subframe,\mu} + n_{s,f}^u\right) \cdot \frac{1}{T_{SRS}} \right\rfloor,$$

where the $n_{s,f}^\mu \in \{0, \ldots, N_{slot}^{frame,\mu}-1\}$ is an intra-frame time slot index, the $n_f$ is a system frame number, the $N_{slot}^{subframe,\mu}$ is a number of time slots contained in one subframe, the $N_{slot}^{frame,\mu}$ is a number of time slots contained in one system frame, the $T_{SRS}$ is an SRS periodicity, the N is a number of time domain symbols configured for sending the SRS in the time slot, the R is a number of repeated time domain symbols in a time slot or a number of SRS time domain symbols occupying a same frequency domain position in a time slot, and the $n_{SRS}$ is the sending quantity or number of the uplink SRS on the time domain.

16. A communication system, comprising a first communication node and a second communication node, wherein
   the second communication node is configured to determine a radio resource used to send a reference signal; and send the reference signal using the radio resource; and
   the first communication node is configured to determine the radio resource used by the second communication node to send the reference signal; and receive the reference signal that is sent by the second communication node using the radio resource;
   wherein the first communication node is configured to determine the radio resource used by the second communication node to send the reference signal by the following steps:

when the radio resource comprises the code domain resource and the code domain resource comprises a base sequence that the second communication node uses to send the reference signal, determining a base sequence number of the reference signal according to a pseudo-random number corresponding to an index of a time slot where the reference signal sent by the second communication node is located;

determining a base sequence number of the reference signal according to a sequence group number on a time slot where the reference signal sent by the second communication node is located;

determining a base sequence number of the reference signal according to a sequence length on a time slot where the reference signal sent by the second communication node is located; and determining a base sequence number of the reference signal according to a sequence identity on a time slot where the reference signal sent by the second communication node is located.

17. The method as claimed in claim 10, wherein the determining a base sequence number of the reference signal according to a sequence group number on a time slot where the reference signal sent by the second communication node is located comprises one of the followings:

$$v = u(n_s) \bmod 2;$$

$$v = \begin{cases} 0 & \text{if } 0 \leq u \leq 14 \\ 0 & \text{otherwise} \end{cases}; \text{ and}$$

$$v = \begin{cases} 0 & \text{if } 0 \leq u \leq 14 \\ 0 & \text{otherwise} \end{cases},$$

where the v is the base sequence number of an uplink reference signal, the $n_s$ is a time slot number, and the $u(n_s)$ represents sequence group numbers on different time slots.

18. The method as claimed in claim 10, wherein the determining a base sequence number of the reference signal according to a sequence group number and a sequence identity on a time slot where the reference signal sent by the second communication node is located comprises one of the followings:

when the sequence identity is greater than or equal to 0 and smaller than 252, v=0, and when the sequence identity is greater than or equal to 0 and smaller than 252, v=1;

when the sequence identity is greater than or equal to 0 and smaller than 252, v=1, and when the sequence identity is greater than or equal to 0 and smaller than 252, v=0; and when the sequence identity is greater than or equal to 0 and smaller than 504, v=u($n_s$)mod 2;

$$v = \begin{cases} 1 & \text{if } 0 \leq u \leq 14 \text{ and } 0 \leq \text{sequence identity} < 252 \\ 0 & \text{otherwise} \end{cases};$$

$$v = \begin{cases} 1 & \text{if } 0 \leq u \leq 14 \text{ and } 0 \leq \text{sequence identity} < 252 \\ 0 & \text{otherwise} \end{cases};$$

$$v = \begin{cases} 1 & \text{if } 0 \leq u \leq 14 \text{ and } 252 \leq \text{sequence identity} < 504 \\ 0 & \text{otherwise} \end{cases}; \text{ and}$$

$$v = \begin{cases} 1 & \text{if } 0 \leq u \leq 14 \text{ and } 252 \leq \text{sequence identity} < 504 \\ 0 & \text{otherwise} \end{cases},$$

where the v is the base sequence number of an uplink reference signal, the $n_s$ is a time slot number, and the $u(n_s)$ represents sequence group numbers on different time slots.

* * * * *

UNITED STATES PATENT AND TRADEMARK OFFICE
CERTIFICATE OF CORRECTION

PATENT NO. : 11,424,879 B2
APPLICATION NO. : 16/760053
DATED : August 23, 2022
INVENTOR(S) : Yuxin Wang et al.

It is certified that error appears in the above-identified patent and that said Letters Patent is hereby corrected as shown below:

In the Specification

1. Replace the formula at Column 5, Lines 30-33 with the following corrected version:

$$v = \begin{cases} 0 & \text{if } 0 \leq u \leq 14 \\ 1 & \text{otherwise} \end{cases},$$

2. Replace the formulae at Column 5, Lines 56-65 with the following corrected version:

$$v = \begin{cases} 1 & \text{if } 0 \leq u \leq 14 \text{ and } 0 \leq \text{sequence identity} < 252 \\ 0 & \text{otherwise} \end{cases};$$

$$v = \begin{cases} 0 & \text{if } 0 \leq u \leq 14 \text{ and } 0 \leq \text{sequence identity} < 252 \\ 1 & \text{otherwise} \end{cases};$$

$$v = \begin{cases} 1 & \text{if } 0 \leq u \leq 14 \text{ and } 252 \leq \text{sequence identity} < 504 \\ 0 & \text{otherwise} \end{cases}; \text{ and}$$

$$v = \begin{cases} 0 & \text{if } 0 \leq u \leq 14 \text{ and } 252 \leq \text{sequence identity} < 504 \\ 1 & \text{otherwise} \end{cases},$$

Signed and Sealed this
Seventh Day of March, 2023

*Katherine Kelly Vidal*

Katherine Kelly Vidal
*Director of the United States Patent and Trademark Office*

CERTIFICATE OF CORRECTION (continued)
U.S. Pat. No. 11,424,879 B2

3. Replace the formulae at Column 6, Lines 50-59 with the following:

$$n_{SRS} = \left\lfloor (n_f \cdot 10 \cdot N_{slot}^{subframe,\mu} + n_{s,f}^u) \cdot \frac{N}{R} \cdot \frac{1}{T_{SRS}} \right\rfloor;$$

$$n_{SRS} = \left\lfloor (n_f \cdot N_{slot}^{frame,\mu} + n_{s,f}^u) \cdot \frac{N}{R} \cdot \frac{1}{T_{SRS}} \right\rfloor;$$

$$n_{SRS} = \left\lfloor (n_f \cdot 10 \cdot N_{slot}^{subframe,\mu} + n_{s,f}^u) \cdot \frac{1}{T_{SRS}} \right\rfloor; \text{ and}$$

$$n_{SRS} = \left\lfloor (n_f \cdot N_{slot}^{frame,\mu} + n_{s,f}^u) \cdot \frac{1}{T_{SRS}} \right\rfloor.$$

4. Replace the formulae at Column 8, Lines 15-24 with the following:

$$n_{SRS} = \left\lfloor (n_f \cdot 10 \cdot N_{slot}^{subframe,\mu} + n_{s,f}^u) \cdot \frac{N}{R} \cdot \frac{1}{T_{SRS}} \right\rfloor;$$

$$n_{SRS} = \left\lfloor (n_f \cdot N_{slot}^{frame,\mu} + n_{s,f}^u) \cdot \frac{N}{R} \cdot \frac{1}{T_{SRS}} \right\rfloor;$$

$$n_{SRS} = \left\lfloor (n_f \cdot 10 \cdot N_{slot}^{subframe,\mu} + n_{s,f}^u) \cdot \frac{1}{T_{SRS}} \right\rfloor; \text{ and}$$

$$n_{SRS} = \left\lfloor (n_f \cdot N_{slot}^{frame,\mu} + n_{s,f}^u) \cdot \frac{1}{T_{SRS}} \right\rfloor.$$

5. Replace the formulae at Column 9, Lines 43-48 with the following:

$$v = \begin{cases} 1 & \text{if } 0 \leq u \leq 14 \\ 0 & \text{otherwise} \end{cases}; \text{ and}$$

$$v = \begin{cases} 0 & \text{if } 0 \leq u \leq 14 \\ 1 & \text{otherwise} \end{cases}.$$

6. Replace the formulae at Column 10, Lines 1-11 with the following:

$$v = \begin{cases} 1 & \text{if } 0 \leq u \leq 14 \text{ and } 0 \leq \text{sequence identity} < 252 \\ 0 & \text{otherwise} \end{cases};$$

$$v = \begin{cases} 0 & \text{if } 0 \leq u \leq 14 \text{ and } 0 \leq \text{sequence identity} < 252 \\ 1 & \text{otherwise} \end{cases};$$

$$v = \begin{cases} 1 & \text{if } 0 \leq u \leq 14 \text{ and } 252 \leq \text{sequence identity} < 504 \\ 0 & \text{otherwise} \end{cases}; \text{ and}$$

$$v = \begin{cases} 0 & \text{if } 0 \leq u \leq 14 \text{ and } 252 \leq \text{sequence identity} < 504 \\ 1 & \text{otherwise} \end{cases}.$$

7. Replace the formulae at Column 10, Lines 56-64 with the following:

$$n_{SRS} = \left\lfloor (n_f \cdot 10 \cdot N_{slot}^{subframe,\mu} + n_{s,f}^u) \cdot \frac{N}{R} \cdot \frac{1}{T_{SRS}} \right\rfloor;$$

$$n_{SRS} = \left\lfloor (n_f \cdot N_{slot}^{frame,\mu} + n_{s,f}^u) \cdot \frac{N}{R} \cdot \frac{1}{T_{SRS}} \right\rfloor;$$

$$n_{SRS} = \left\lfloor (n_f \cdot 10 \cdot N_{slot}^{subframe,\mu} + n_{s,f}^u) \cdot \frac{1}{T_{SRS}} \right\rfloor; \text{ and}$$

$$n_{SRS} = \left\lfloor (n_f \cdot N_{slot}^{frame,\mu} + n_{s,f}^u) \cdot \frac{1}{T_{SRS}} \right\rfloor.$$

8. Replace the formulae at Column 13, Lines 2-9 with the following:

$$v = \begin{cases} 1 & \text{if } 0 \leq u \leq 14 \\ 0 & \text{otherwise} \end{cases}; \text{ and}$$

$$v = \begin{cases} 0 & \text{if } 0 \leq u \leq 14 \\ 1 & \text{otherwise} \end{cases}.$$

9. Replace the formulae at Column 13, Lines 26-37 with the following:

$$v = \begin{cases} 1 & \text{if } 0 \leq u \leq 14 \text{ and } 0 \leq \text{sequence identity} < 252 \\ 0 & \text{otherwise} \end{cases}$$

$$v = \begin{cases} 0 & \text{if } 0 \leq u \leq 14 \text{ and } 0 \leq \text{sequence identity} < 252 \\ 1 & \text{otherwise} \end{cases}$$

$$v = \begin{cases} 1 & \text{if } 0 \leq u \leq 14 \text{ and } 252 \leq \text{sequence identity} < 504 \\ 0 & \text{otherwise} \end{cases}$$

$$v = \begin{cases} 0 & \text{if } 0 \leq u \leq 14 \text{ and } 252 \leq \text{sequence identity} < 504 \\ 1 & \text{otherwise} \end{cases}$$

10. Replace the formulae at Column 14, Lines 46-56 with the following:

$$n_{SRS} = \left\lfloor (n_f \cdot 10 \cdot N_{slot}^{subframe,\mu} + n_{s,f}^u) \cdot \frac{N}{R} \cdot \frac{1}{T_{SRS}} \right\rfloor;$$

$$n_{SRS} = \left\lfloor (n_f \cdot N_{slot}^{frame,\mu} + n_{s,f}^u) \cdot \frac{N}{R} \cdot \frac{1}{T_{SRS}} \right\rfloor;$$

$$n_{SRS} = \left\lfloor (n_f \cdot 10 \cdot N_{slot}^{subframe,\mu} + n_{s,f}^u) \cdot \frac{1}{T_{SRS}} \right\rfloor; \text{ and}$$

$$n_{SRS} = \left\lfloor (n_f \cdot N_{slot}^{frame,\mu} + n_{s,f}^u) \cdot \frac{1}{T_{SRS}} \right\rfloor.$$

In the Claims

11. Column 17, Lines 43 and 48, In Claim 3, replace the formulae with the following:

$$v = \begin{cases} 1 & \text{if } 0 \leq u \leq 14 \\ 0 & \text{otherwise} \end{cases}; \text{ and}$$

$$v = \begin{cases} 0 & \text{if } 0 \leq u \leq 14 \\ 1 & \text{otherwise} \end{cases},$$

CERTIFICATE OF CORRECTION (continued)
U.S. Pat. No. 11,424,879 B2

12. Column 18, Lines 8, 9, 13, and 14, In Claim 4, replace the formulae with the following:

$$v = \begin{cases} 1 & \text{if } 0 \leq u \leq 14 \text{ and } 0 \leq \text{sequence identity} < 252 \\ 0 & \text{otherwise} \end{cases};$$

$$v = \begin{cases} 0 & \text{if } 0 \leq u \leq 14 \text{ and } 0 \leq \text{sequence identity} < 252 \\ 1 & \text{otherwise} \end{cases};$$

$$v = \begin{cases} 1 & \text{if } 0 \leq u \leq 14 \text{ and } 252 \leq \text{sequence identity} < 504 \\ 0 & \text{otherwise} \end{cases}; \text{ and}$$

$$v = \begin{cases} 0 & \text{if } 0 \leq u \leq 14 \text{ and } 252 \leq \text{sequence identity} < 504 \\ 1 & \text{otherwise} \end{cases},$$

13. Columns 18-19, Line 65 and Line 5, In Claim 9, replace the formulae with the following:

$$n_{SRS} = \left\lfloor (n_f \cdot 10 \cdot N_{slot}^{subframe,\mu} + n_{s,f}^u) \cdot \frac{N}{R} \cdot \frac{1}{T_{SRS}} \right\rfloor;$$

$$n_{SRS} = \left\lfloor (n_f \cdot N_{slot}^{frame,\mu} + n_{s,f}^u) \cdot \frac{N}{R} \cdot \frac{1}{T_{SRS}} \right\rfloor;$$

$$n_{SRS} = \left\lfloor (n_f \cdot 10 \cdot N_{slot}^{subframe,\mu} + n_{s,f}^u) \cdot \frac{1}{T_{SRS}} \right\rfloor; \text{ and}$$

$$n_{SRS} = \left\lfloor (n_f \cdot N_{slot}^{frame,\mu} + n_{s,f}^u) \cdot \frac{1}{T_{SRS}} \right\rfloor,$$

CERTIFICATE OF CORRECTION (continued)
U.S. Pat. No. 11,424,879 B2

14. Column 20, Lines 34 and 38, In Claim 15, replace the formulae with the following:

$$n_{SRS} = \left\lfloor (n_f \cdot 10 \cdot N_{slot}^{subframe,\mu} + n_{s,f}^u) \cdot \frac{N}{R} \cdot \frac{1}{T_{SRS}} \right\rfloor;$$

$$n_{SRS} = \left\lfloor (n_f \cdot N_{slot}^{frame,\mu} + n_{s,f}^u) \cdot \frac{N}{R} \cdot \frac{1}{T_{SRS}} \right\rfloor;$$

$$n_{SRS} = \left\lfloor (n_f \cdot 10 \cdot N_{slot}^{subframe,\mu} + n_{s,f}^u) \cdot \frac{1}{T_{SRS}} \right\rfloor; \text{ and}$$

$$n_{SRS} = \left\lfloor (n_f \cdot N_{slot}^{frame,\mu} + n_{s,f}^u) \cdot \frac{1}{T_{SRS}} \right\rfloor,$$

15. Column 21, Lines 29-33, In Claim 17, replace the formulae with the following:

$$v = \begin{cases} 1 & \text{if } 0 \leq u \leq 14 \\ 0 & \text{otherwise} \end{cases}; \text{ and}$$

$$v = \begin{cases} 0 & \text{if } 0 \leq u \leq 14 \\ 1 & \text{otherwise} \end{cases},$$

16. Column 22, Lines 24, 25, 29 and 30, In Claim 18, replace the formulae with the following:

$$v = \begin{cases} 1 & \text{if } 0 \leq u \leq 14 \text{ and } 0 \leq \text{sequence identity} < 252 \\ 0 & \text{otherwise} \end{cases};$$

$$v = \begin{cases} 0 & \text{if } 0 \leq u \leq 14 \text{ and } 0 \leq \text{sequence identity} < 252 \\ 1 & \text{otherwise} \end{cases};$$

$$v = \begin{cases} 1 & \text{if } 0 \leq u \leq 14 \text{ and } 252 \leq \text{sequence identity} < 504 \\ 0 & \text{otherwise} \end{cases}; \text{ and}$$

$$v = \begin{cases} 0 & \text{if } 0 \leq u \leq 14 \text{ and } 252 \leq \text{sequence identity} < 504 \\ 1 & \text{otherwise} \end{cases},$$